United States Patent [19]

Paciorek

[11] Patent Number: 4,588,465

[45] Date of Patent: May 13, 1986

[54] METHOD FOR FORMING A SEALED CONTAINER

[75] Inventor: Walter J. Paciorek, Woodbury, Minn.

[73] Assignee: Minnesota Mining and Manufacturing Company, St. Paul, Minn.

[21] Appl. No.: 464,120

[22] Filed: Feb. 4, 1983

[51] Int. Cl.⁴ .......................... B31F 1/00; B32B 31/00; B65D 55/02; B29C 13/02

[52] U.S. Cl. .................................... 156/220; 156/222; 156/265; 156/306.6; 215/230; 215/232; 215/347; 264/268; 264/509

[58] Field of Search ............... 156/220, 209, 251, 219, 156/222, 262, 265, 295, 298, 299, 306.6; 264/509, 268, 261, 263, 516; 215/230, 232, 347; 428/915, 916, 579, 542.8

[56] References Cited

U.S. PATENT DOCUMENTS

| | | | |
|---|---|---|---|
| 2,620,939 | 12/1952 | Weisgerber . | |
| 3,101,992 | 8/1963 | Cooke et al. | 264/268 |
| 3,683,806 | 8/1972 | Rudolph | 428/916 |
| 3,908,065 | 9/1975 | Stigen | 156/220 |
| 4,006,050 | 2/1977 | Hurst et al. | 428/916 |
| 4,018,640 | 4/1977 | Amberg | 156/209 |
| 4,092,199 | 5/1978 | Ungar et al. | 264/137 |
| 4,093,766 | 6/1978 | Scher et al. | 264/137 |
| 4,310,100 | 1/1982 | Kunimoto et al. | 215/230 |

OTHER PUBLICATIONS

Advertisement–published in Packaging Digest for 12–1982 (System of Philip Lochman & Company).

*Primary Examiner*—Edward Kimlin
*Assistant Examiner*—Louis Falasco
*Attorney, Agent, or Firm*—Donald M. Sell; James A. Smith; John C. Barnes

[57] ABSTRACT

The barrier in a closure liner can be formed with a distinctive design or logo when the closure liner is inserted in the cap by placing a male embossing die against the sealing layer of the closure liner with sufficient force to emboss an image in the foil layer. The embossing of indicia into the liner at the time the cap is to be placed on the container provides the manufacturer with his own distinctive logo which cannot be readily duplicated thus making the container closure tamper-resistant.

5 Claims, 11 Drawing Figures

METHOD FOR FORMING A SEALED CONTAINER

BACKGROUND OF THE INVENTION

1. Field of the Invention

This invention relates to an improvement in imparting indicia to a laminate material and in one aspect to the method of and apparatus for forming a liner, and the resulting liner for containers of consumable substances having a distinctive design or logo thereon.

2. Description of the Prior Art

This invention relates to an improvement in the art of forming a tamper-resistant seal for a container and in one aspect relates to a method of embossing the facing of a closure liner or barrier sealed on a container such that it can readily be determined whether or not the barrier is an original barrier placed on the container by the packaging company. The barrier in the instant invention is adhered to the container about the opening thereof and is covered by a removable cap having a gasket formed from the closure liner backing.

It is well known in the art to utilize a closure liner material which in the presence of radiation will form a rupturable seal about the opening on a plastic or glass container. Upon removal of the cap, separation between the laminate material comprising the pulpboard which is adhered in the cap and the laminate structure which is adhered to the bottle is well known in the art. This material however may be obtained and applied by one other than the original packager of the product contained within the container. Even if the liner material is preprinted with indicia it is possible that liner stock used on a larger container can be cut to replace a preprinted liner on a smaller bottle. It is thus desirable, and in fact, necessary that manufacturers now apply a tamper-resistant closure such that the package is sealed and place identification on that seal. The seal should not be readily reproduced and resist tampering.

The prior art has seals for containers comprising a laminate of a vapor impervious metal layer secured to a sealable layer which in contact with the container may be sealed thereto about the opening. It also will show printed messages on the seals to identify the seal, such printed messages being ink printed prior to adhesion of the seal to the container.

The prior art also provides a teaching of sealing a container with a removable seal which when placed into the cap of a container is pressed against a male die molded into the interior surface of the plastic cap such that the male die imparts into the seal material an embossed image but which remains in engagement with the cap as the seal is sealed onto the container, as by induction heating and upon subsequent removal of the cap, the male die will partially obliterate the embossed image unless a heavy gauge foil liner is used. The initial relative motion between the cap and a fixed seal formed of thin foils will cause torsion marks to show in the image area of the seal.

The problem however is to provide a seal for a container utilizing presently available and commerically accepted container sealing material and add a distinctive logo to the seal without materially changing the sealing material or cap sealing equipment.

The present invention provides one method for complying with the new regulations as spelled out in amendments to Food and Drug Administration Rules, see 21 CFR 211; 314 and 700, requiring that the producer provide a seal which is a barrier to or indicator of entry and that has a distinctive design or logo. Due to the difficulty in resisting tampering with preprinted liner material, the fact that printing requires an extra step in the manufacture, added cost and discovery of an ink which will not act as an adhesive or transfer and is approved for use with food it has thus become necessary to define a practical method for applying the distinctive design or logo to each seal for the containers. The present invention has the objective of obtaining the indicia in the seal material by embossing the liner material and imparting graphics thereto which are not readily reproducible by anyone desiring to remove the original manufacturer's seal and reseal the container with a different seal.

The present invention provides an improved apparatus comprising embossing means for forming an embossment in the closure liner material to form indicia on the liner material which is separable from the material adhered in the cover of the container without damaging the indicia imparted to the seal.

The present invention provides an improved method whereby indicia may be imparted to a laminate structure to emboss indicia into one portion of the laminate structure while applying the laminate structure to the cap of the container.

The present invention has as a further object thereof the formation of a laminate closure liner material formed of a laminate of a deformable resilient absorbent liner material coated with a bonding material having low shear and release characteristics, in contact with a vapor barrier layer which barrier layer is adhered to a tough flexible thermoplastic material coated with a heat sealable layer for adherence to the container.

A further object of the present invention is the formation of a seal over the opening of a container which will seal the opening and will bear indicia which will identify the fact that the container has been sealed by the manufacturer and the seal will provide a tamper-resistant construction such that the consumer upon inspection of the seal, may identify that the seal has been tampered with or that the replaced seal does not bear indicia corresponding to the original indicia of the manufacturer.

SUMMARY OF THE INVENTION

The present invention comprises a composite liner material comprising a deformable resilient layer, e.g. pulpboard coated with a layer of a readily releasable bonding material, e.g. a wax, contacting a foil layer which foil layer is adhesively bonded to a layer of strong tough thermoplastic or cellulosic material coated with a heat sealable layer, e.g., a polyolefin. This laminate material is capable of being embossed by a male die being pressed against the sealing layer and, with a suitable support opposite the backing material, an image may be imparted into the foil layer corresponding to that of the image on the male die.

The apparatus according to the present invention comprises a cap-lining machine wherein a cap is oriented by movement into a first station, such as defined on a star wheel, by which the cap is moved to a second station wherein a spot of adhesive is placed in the inside of the cap adjacent the flat surface thereof opposite the exterior top. The wheel advances the cap to the next station wherein a cutting die is driven through the laminate material defining the closure liner. The die cuts from the laminate material an insert in the shape of the cap and places the same into the cap. The cap is then advanced to a fourth station wherein a plunger moves into the cap to drive the insert against the adhesive in the cap to secure the backing material to the inside of the cap. An alternative is to use a liner insert with a greater diameter than the inner diameter of the cap such that it will be frictionally held in place in the cap. The undersurface of the plunger has an embossing die thereon which is formed with a male defining a predetermined indicia. The die is forced against the sealable layer of the laminate. Preferably the plunger is formed to receive a removable die portion such that different dies may be inserted onto the plunger for imparting different indicia to successive batches of caps having the liner material.

The method practiced by the apparatus is to cut from the cap liner laminate material an insert for placement in the cap and subsequent sealing to the container, placing the insert into the cap, forcing an embossing die having a projecting image defining area against the exposed surface of the laminate material with sufficient force to distort the embossable barrier layer of the laminate to define therein visible images formed from the embossing die.

The resulting container comprises a container structure having a neck terminating at an opening through which the contents may be placed in and removed from the container. A cap is attached to the container over the opening and is adhered thereto as by mating threads, friction or a snap fit. On the inner surface of the cap a liner material is affixed to be removable with the cap. The container has a laminate adhered thereto comprising a vapor impervious layer, a tough strong layer and a sealing layer. The upper layer has a distinctive design embossed thereon.

DESCRIPTION OF THE DRAWING

The present invention will be further described with reference to the accompanying drawing wherein:

FIG. 5 illustrates the embossing step;

DESCRIPTION OF THE PREFERRED EMBODIMENT

This invention provides an improvement in presently available packaging to place on commercially available lining material for plastic or glass containers embossed indicia which will identify by a distinctive design or logo that the barrier on the ultimate container was placed there by the manufacturer for protection of the consumer. Such barriers or seals provide the consumer with visible evidence, should such distinctive design or logo be missing from the liner, that it has been replaced.

The method for imparting the distinctive design or logo into the closure liner differs from other methods of so imparting such indicia to the liner as it is done at the time of cap-lining and does not utilize preprinted materials and permits the customer to continue to use the materials with which he is familiar without significant change in the equipment for practicing the method.

Figure 1:
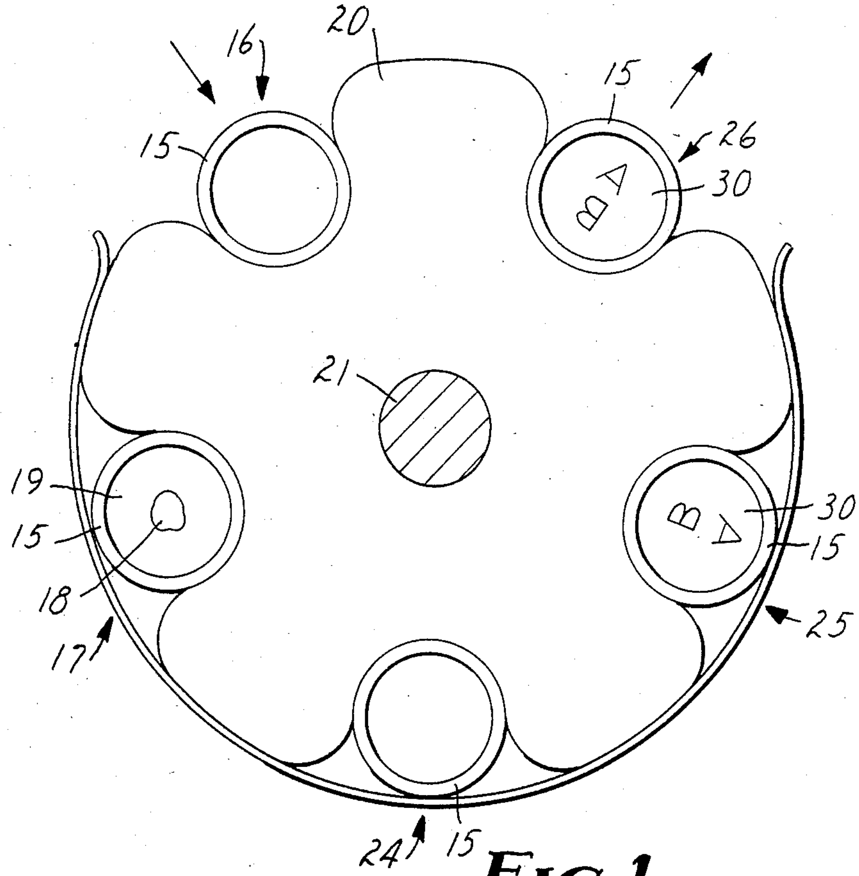
FIG. 1 is a horizontal sectional view through a machine for placing the closure liner material of the present invention into the cap and embossing the design into the liner material.

Referring now to the drawing, FIG. 1 illustrates the use of a star wheel 20 of a rotary lining machine at which the caps 15 are fed by suitable conveyor means, not shown, into the load station generally designated 16, upon movement of the star wheel 20 into register with such load station. Rotation of the star wheel 20 on a shaft 21 advances the cap 15 to a first glue station 17 wherein a spot of adhesive 18 is placed into the cap against the surface 19 of the cap opposite its top.

The cap 15 is then advanced to the liner cutting and inserting station 24 wherein a section of the liner material is cut and placed in the cap. The next station is station 25 at which the insert 30 is embossed and forced into the cap 15 to affix the same to the cap and simultaneously image the liner. The cap 15 is then advanced to station 26 where the cap 15 containing the insert 30 is discharged from the rotary lining machine and advanced to the next packaging station.

Figure 2:
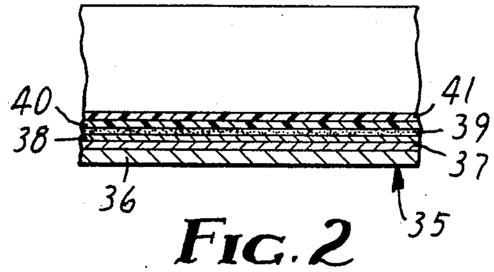
FIG. 2 is a detailed cross-sectional view of the material for forming the closure liner.

FIG. 2 illustrates an example of a suitable closure liner 35 such as is available from Minnesota Mining and Manufacturing Company, St. Paul, Minnesota and identified as 75M comprises a backing layer 36 of deformable resilient material such as pulpboard having a thickness of 35 mils. The backing 36 has a coating of readily releasable bonding material 37 coated thereon. The material 37 is preferably a wax which is coated on the backing 36 and absorbed by the backing but it releasably bonds the backing onto the next layer, a layer of ductile embossable vapor impermeable material 38 such as a metal foil, preferably dead soft aluminum. The foil layer 38 is engaged with the wax layer 37 and has a desired thickness of 1 mil. The foil layer 38 is adhesively bonded by a layer of adhesive 39 to a tough thermoplastic film material 40 such as polyethylene terephthalate having a thickness of 0.5 mil. The adhesive 39 for bonding the polyethylene terephthalate (polyester) film to the foil layer 38 is preferably a polyurethane or an adhesive from the nitrile or vinyl family. Laminated to the film layer 40 is a sealing layer 41 having a desired thickness of 1.5 mils. An example of the sealing layer may be polyethylene.

Figure 3:
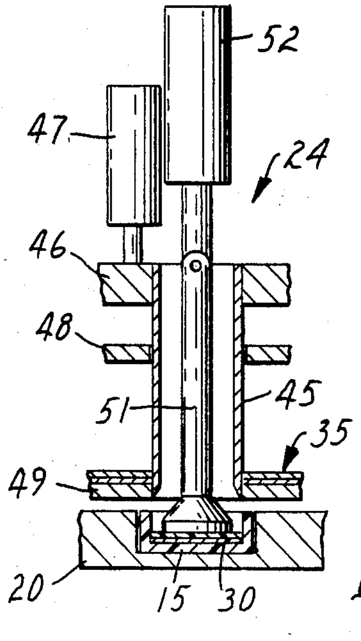
FIG. 3 is a fragmentary vertical sectional view at the cutting station.

FIG. 3 illustrates the cutting and inserting station 24 wherein the star wheel 20 has positioned a cap 15 in registration with a vertically movable cutting die 45 supported on a vertically reciprocatory table 46. The table 46 is supported above the star wheel 20 and is movable vertically to perform the functions at the various stations simultaneously each time the star wheel stops and is movable in response to the operation of a suitable driving means such as a cam or motor, illustrated as the cylinder 47. The cutting die 45 is guided through a guide member 48 to penetrate a section of the liner material 35 disposed across an anvil 49. Vertical movement of the cutting die 45 through the material 35 and into the anvil 49 cuts an insert 30 from the liner material 35. This insert 30 is then driven from the end of the die 45 into the cap 15 by a driver 51 driven from a suitable motor 52 movable in response to the cutting die 45 reaching a predetermined position with respect to the anvil 49. Motor 47 then retracts the cutting die and the driver 51 is retracted and the star wheel 20 is indexed to advance the cap 15 to the embossing station 25.

Figure 4:
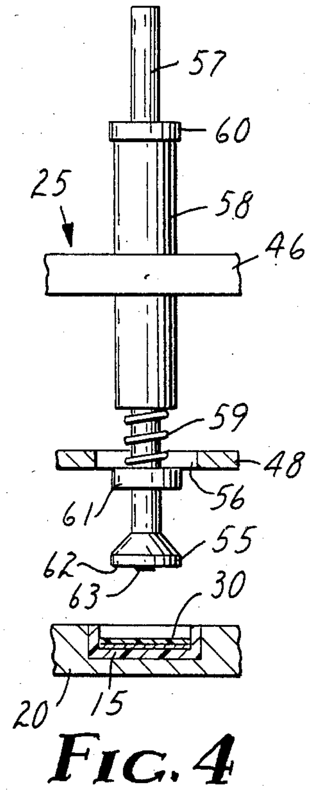
FIGS. 4 and 5 are detailed vertical sectional views of the embossing station with FIG. 4 showing the die before movement into engagement with the liner material.

In FIG. 4, a view of the embossing station 25, the plate 46 is in the raised position, maintaining a plunger 55 in a raised position with respect to the star wheel 20. The fixed guide plate 48 is formed with an opening 56 through which the plunger 55 is positioned. The plunger 55 is provided with a shaft 57 extending through a sleeve 58 fixed to the plate 46 and a helical compression spring 59 urges the plunger 55 downwardly with respect to the sleeve 58 until the stop 60 rests against the top of the sleeve 58. The spring 59 is biased against a further adjustable collar 61 which controls the adjustment of the pressure of the plunger 55 against the insert 30 in the cap 15.

Figure 5:
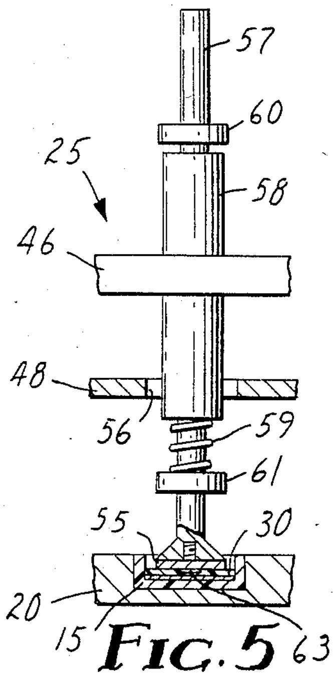

At the bottom of the plunger 55 is a die member 62 which is formed with projecting male embossing dies 63 engageable with the insert 30 to impart thereto a distinctive design or logo. The embossing die is preferably a removable insert threaded into the bottom of the plunger 55 as illustrated in FIG. 5. This die could be formed on the bottom of the driver 51 and station 25 could be eliminated.

FIG. 5 illustrates the plate 46 being moved to its lower position wherein the plunger 55 has caused the die 62 to be driven into engagement with the insert 30 to force the same tightly against the spot of adhesive 18 causing the same to spread about the surface of the cap and has moved the die 62 against the sealing layer 41 of the liner insert 30 with sufficient force to compress the spring 59 and raise the collar 60 from the sleeve 58.

Figure 6:
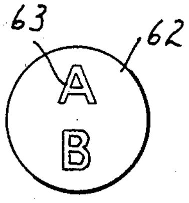
FIG. 6 is a bottom view of the embossing die.
Figure 7:
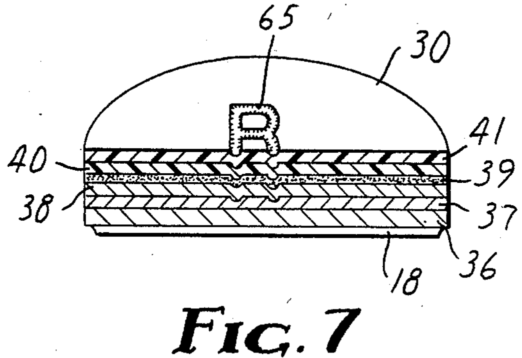
FIG. 7 is an enlarged exaggerated sectional view of the liner material after being embossed at the embossing station.

The bottom of the die 62 with the raised indicia 63 is illustrated in FIG. 6, and the insert 30 in the embossing station 25 has the die 62 forced thereagainst, causing the sealing layer 41 to be recessed as at 65 which in turn forces the tough layer 40 against the foil layer 38 with sufficient force to drive the foil layer 38 into the wax coating 37 and into the pulpboard 36 in the selected areas to define in the foil layer an embossed image corresponding to that on the die 62. The differential pressure at the edges of the projecting die member 63 deform the ductile edges of the foil layer 38 to define the image therein. This is illustrated diagrammatically in FIG. 7. Further, the die 62 could be formed with a projecting edge adjacent its outer periphery to act as a cutting die to cut the sealing layer 41 and at least part of the thermoplastic layer 40 to weaken these layers within the sealing edge of the liner to make the barrier sealed to the container more easily rupturable by the customer.

The cap is then advanced from the sealing and embossing station 25 to the discharge station 26 wherein the caps are then fed onto the next station of the packaging machine.

Figure 8:
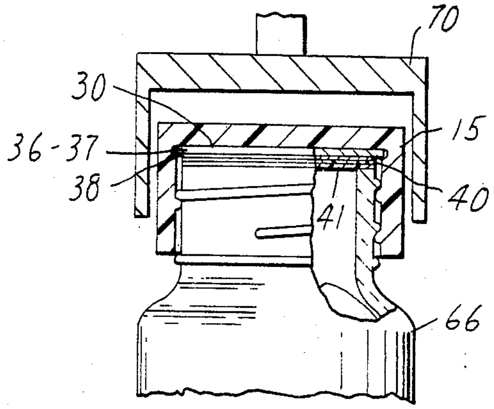
FIG. 8 is a detailed sectional view of the container at the liner sealing station.

The caps bearing the embossed liners are later applied to the filled containers 66, as illustrated in FIG. 8. The caps are affixed to the filled container about the top thereof with the sealing layer 41 of the closure liner contacting the edge of the container surrounding the opening. The sealing layer is then adhered to the container about the opening by radiant energy, such as induction heating the foil layer sufficiently to activate the sealing layer to cause it to adhere to the container surface about the opening. The heating is accomplished by a head 70 being placed about the cap, as illustrated in FIG. 8.

Figure 9:
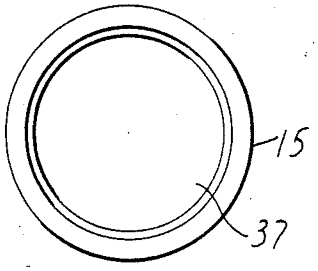
FIG. 9 is a bottom view of the cap after removal from the container.
Figure 10:
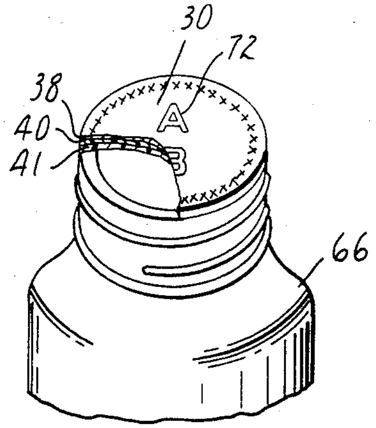
FIG. 10 is a fragmentary perspective view of the container showing the container barrier with the embossed liner with the indicia sealed onto the container.

After the closure liner 30 has been sealed to the container 66 and is secured in the cap 15 the container remains well sealed for shipment and storage. When it is desired to remove the cap from the container the cap is separated by rotation of the cap relative to the container when the cap and container are internally threaded as illustrated in FIG. 8. Separation of the cap from the container causes a parting of the laminate between the wax coating and the foil layer 38. During the relative rotation to afford separation of the cap, as seen in FIG. 9, the wax 37, since it has been absorbed into the backing 36, releases the indicia, in the bas-relief areas 72 (see FIG. 10) defining the design or logo, and the foil layer 38 from the backing 36.

While the present invention has been described for use with a commercially available closure liner it is equally applicable with different liner constructions. It is feasible to substitute polyamide or cellulosic films for the tough film layer 40 or eliminate the layer 40 and place the heat seal layer 41 directly in contact with the foil layer. Examples of heat seal layers 41 include polyolefin, vinyl based polymeric layers, cellulose nitrate, ethylcellulose, methacrylates, or rubber polymers. An example of such a construction is a 0.5 mil sealing layer; 0.75 mil embossable foil layer; a wax coating; and a 35 mil pulpboard backing.

It is also possible to eliminate the sealing layer if the material forming the embossable layer and the bottle to which it is being sealed are compatible. As an example, a 1 mil foil, wax laminated to a backing material, may be sealed to a high density polyethylene bottle. Also, the embossable layer could be a metal vapor coated sheet, polyvinyl chloride, cellulosic material, laminated cellulosic material and polyethylene or laminated cellulosic material and metal foil.

As a further example, the tough film or polyester may act as a sealing layer. One example of this would be the sealing of a 0.5 mil polyethylene terephthalate/1.0 mil aluminum foil/wax/pulpboard laminate and a polyethylene terephthalate or polyvinyl chloride bottle.

If it is desired to have a tougher or thicker closure liner, an example of such a liner would be a 35 mil. backing, a 3.0 mil embossable material, e.g. metal foil; a 2.0 mil tough polymeric film layer; a 3.0 mil sealing layer.

The male dies 63 of the die 62 should be designed with bas-relief indicia, designs or logo to emboss to a depth of 30 mils when using the thick liner material. At this embossing depth only microscopic rupture occurs in the foil layer but increasing the embossing depth beyond this will increase the degree of foil rupture and decrease the appearance of the liner barrier.

When utilizing the available closure liner with a 1.5 mil sealing layer, a 0.5 mil film layer, a 1.0 mil embossable material, the embossing depth is preferred around 14 mils. Embossing to this depth allows a bold embossed image in the foil layer without rupture of the foil and without the appearance of torque lines in the foil on removal of the cap from the container. When using a closure liner that does not include the tough film layer 40, an embossing depth of 5 mil may be used and an image is detectable in the foil layer with an embossing depth as low as 1 mil. Thus, the preferred height for the male dies 63 on the face of the die 62 is between 2 mils and 30 mils.

The cap may have an annular recess near the top wall to receive an insert of greater diameter than the cylindrical side walls to retain the insert. The larger insert may also be frictionally retained in the cap. Further, the cap may be of flexible material and snap fit a rib surrounding the opening of the container.

Figure 11:
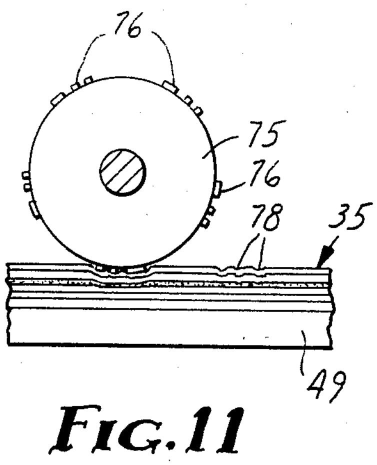
FIG. 11 is a diagrammatic vertical sectional view of a liner material embossing device.

Alternatively, the liner material 35 may be embossed as the strip of liner material is advanced into the lining machine. The cap-lining machine has a drive roller 75 pressed against the liner web to advance the laminate linern material 35 across the anvil 49, and as illustrated in FIG. 11, this roller 75 may have embossing dies 76 formed thereon to emboss the desired design or logo into the liner material 35 as it is advanced to the cutting station. Whether the embossed areas 78 are registered with the opening is a matter of choice. If an embossed area 78 should appear at or adjacent the edge of the liner insert there is no deterioration in the quality of the seal formed between the sealing layer 41 and the edge of the container. Further, the roller 75 could be an elongate cylinder having a plurality of embossing dies positioned along its outer cylindrical surface to pre-emboss a wide strip of the laminate liner material 35. The wide strip could then be convolutely wound and shipped to the customer or slit to narrower strips and shipped to the customer for use in the cap-lining equipment without alteration.

Having thus described the present invention with reference to a preferred embodiment and its application with various closure liner constructions, it should be remembered that other changes or modifications can be made without departing from the spirit and scope of the present invention as defined in the appended claims.

I claim:

1. A process for imparting indicia onto a closure liner for a container cap during application of the liner to the container cap having a top comprising the steps of:

inserting a container cap into the liner inserting station of a lining machine, inserting a small amount of adhesive into the cap against the top of the cap, moving a closure liner laminate, comprising a layer of resilient material having a wax coating which coating contacts one surface of a layer of metal foil on an oposite surface of which is adhered a sealing layer suitable for sealing the laminate to a container, into said inserting station, cutting from said laminate a section of said laminate to fit into said cap, inserting the cut section of said laminate into said cap, pressing said section against the top of said cap, and imparting an embossed image into said laminate to define an embossed image in said metal foil.

2. A process according to claim 1 wherein said imparting step comprises placing a male die in intimate contact against said section of laminate when in said cap with sufficient force to form a deformation in said sealing layer and the foil layer to define an image.

3. A process according to claim 1 wherein said imparting step comprises placing said liner laminate in intimate contact with an embossing roller and rigidly supporting said resilient material to recess said sealing layer and metal foil to define said image in bas-relief on the surface of said metal foil adjacent said layer of resilient material.

4. A process according to claim 1 wherein said imparting step comprises intimately contacting a male die against said sealing layer of the section of laminate when in said cap with sufficient force to form a deformation in said sealing layer and the foil layer to define an image and not rupture the foil layer.

5. A process according to claim 1 wherein said imparting step comprises placing said liner laminate in intimate contact with an embossing roller and rigidly supporting said resilient material to apply sufficient force against said sealing layer with said embossing roller to deform said sealing layer and metal foil to define said image in bas-relief on the surface of said metal foil adjacent said layer of resilient material without rupturing said metal foil.

* * * * *

UNITED STATES PATENT AND TRADEMARK OFFICE

CERTIFICATE OF CORRECTION

PATENT NO. : 4,588,465

DATED : May 13, 1986

INVENTOR(S) : Walter J. Paciorek

It is certified that error appears in the above-identified patent and that said Letters Patent is hereby corrected as shown below:

Column 7, line 16, change "linern" to -- liner --.

Column 8, line 8, change "oposite" to -- opposite --.

Signed and Sealed this

Twenty-first Day of April, 1987

*Attest:*

DONALD J. QUIGG

*Attesting Officer* *Commissioner of Patents and Trademarks*